April 9, 1946.   G. H. WALKER   2,398,167
TRANSMISSION DYNAMOMETER
Filed Oct. 25, 1944   2 Sheets-Sheet 1
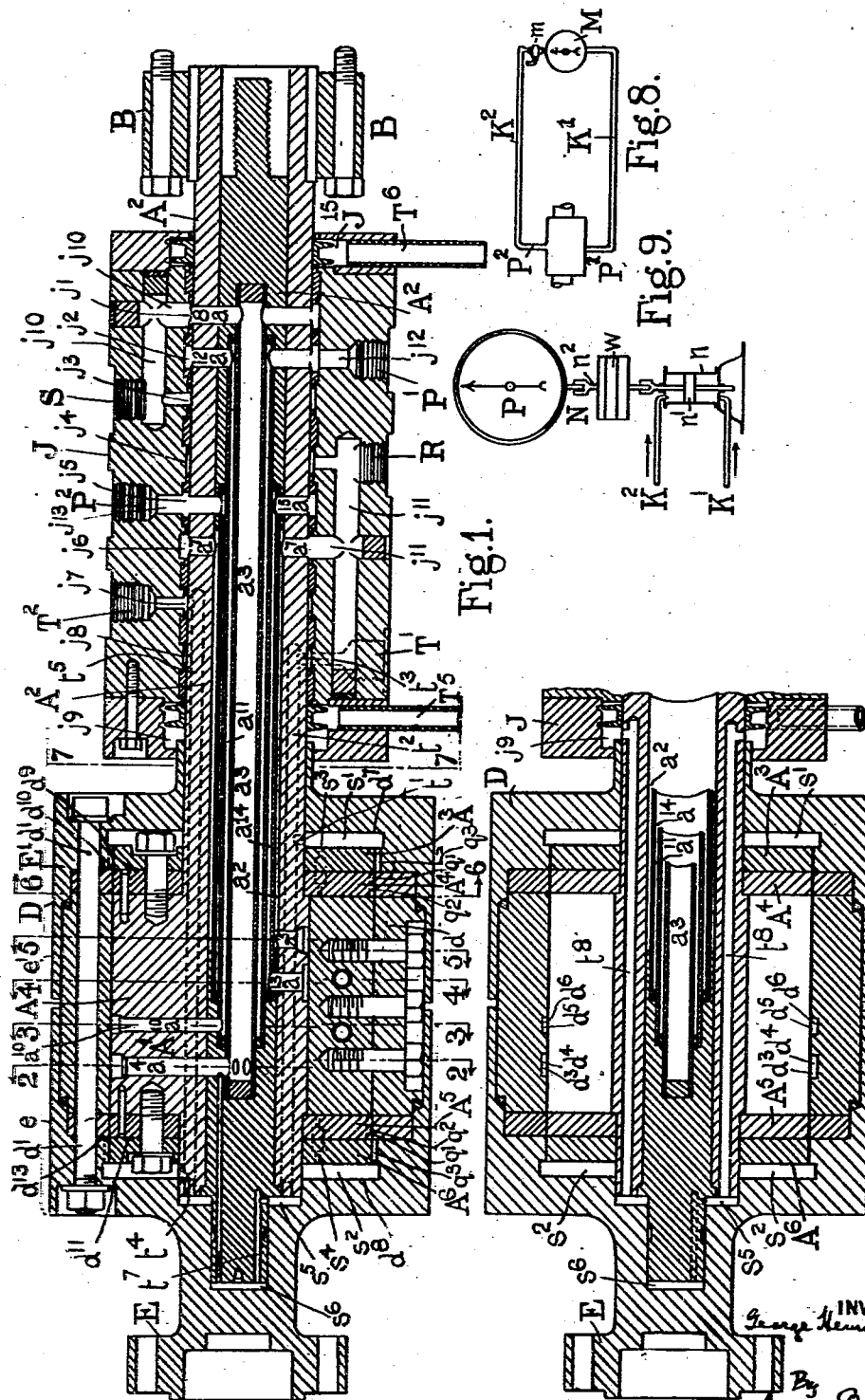

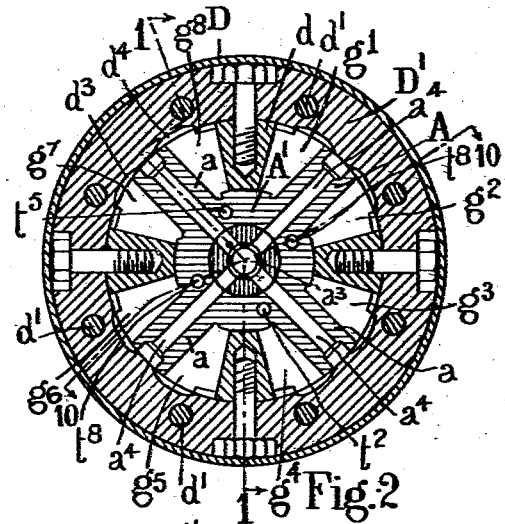
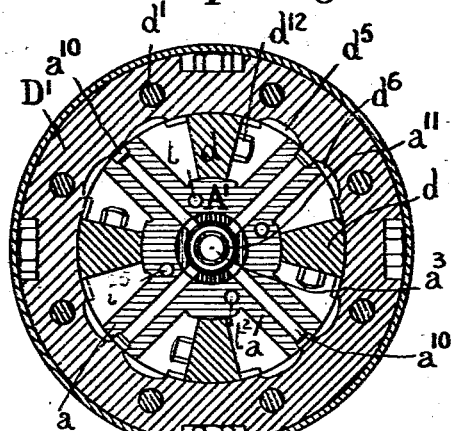
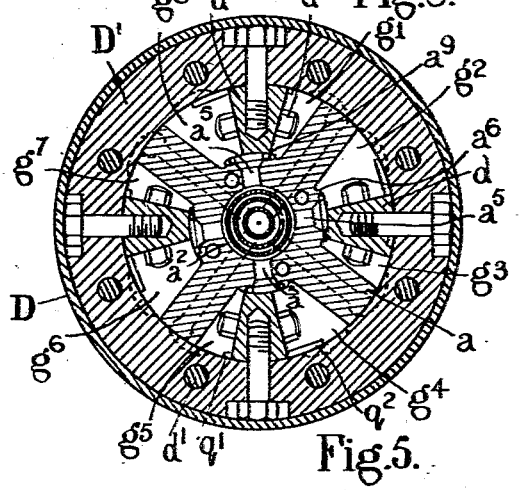
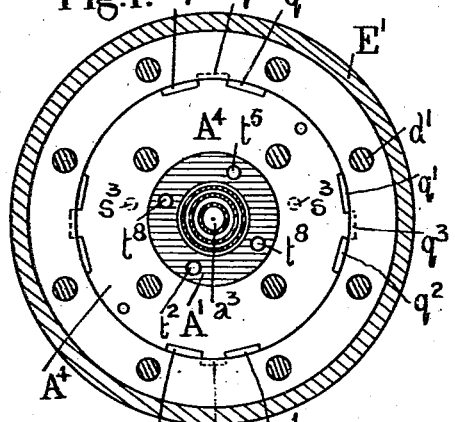

Patented Apr. 9, 1946

2,398,167

UNITED STATES PATENT OFFICE 2,398,167

TRANSMISSION DYNAMOMETER

George Henry Walker, Worcester, England, assignor to Heenan & Froude Limited, Worcester, England Application October 25, 1944, Serial No. 560,321
In Great Britain November 16, 1943

8 Claims. (Cl. 73—136)

This invention relates to transmission dynamometers for transmitting power from a driving to a driven shaft and also of indicating the magnitude of the torque being transmitted comprising a driving element connected to the driving shaft and a driven element to the driven shaft, the two elements being co-axial and capable of limited angular movement in relation to one another, torque being transmitted from the driving to the driven element by liquid under pressure, such pressure varying with the amount of torque whereby a measurement of the pressure gives an indication of the torque being transmitted.

It relates particularly to such dynamometers of the kind in which the driving element consists of a spider having two or more radial arms, arranged at equal angular distances apart, and the driven element consists of an annulus surrounding the driving element and having the same number of radial arms which project inwards towards the boss of the driving element and are interspaced between the arms of the latter, the inter-spaced radial arms of the two elements thus forming a series of chambers the number of which is twice the number of arms on each element half the number of these chambers being filled under running conditions with liquid under pressure, the magnitude of which depends upon the magnitude of the torque to be transmitted and the remaining chambers or spaces which alternate with those filled with liquid under high pressure being filled with liquid under relatively low pressure, the high pressure chambers being connected to an external pump, preferably driven by independent means, giving a continuous supply of liquid under pressure thereto and the low pressure chambers being connected with a liquid reservoir from which the pump sucks the liquid, the high pressure chambers being also connected to the low pressure chambers or spaces to provide a passage for the escape of the surplus liquid from the former, the area of which passage is automatically varied so as to build up a differential pressure of liquid acting upon the surface of the radial arms to transmit torque from the driving to the driven element.

In the transmission dynamometer of the kind to which the invention more particularly relates a measurement of the difference in pressure between the high pressure chambers and the low pressure chambers, which difference in pressure is a function of the torque transmitted has been obtained by arranging a differential pressure indicating device between the high pressure liquid supply and the low pressure liquid return but it is found that this does not give an accurate torque indication owing to pressure differences arriving from the motion and velocity of the fluid in the passages connecting the pressure chambers with the pump and sump respectively.

One feature of the present invention consists of a modification of the means by which the high pressure and low pressure chambers or spaces of the torque-transmitting element are connected to the torque-indicating gauge or weighing machine. According to this feature of the invention the aforesaid chambers or spaces are connected with pressure-tapping passages which are independent of the passages by which the circulating oil or other liquid is conveyed to and from the same spaces. These additional pressure-tapping passages communicate with a zone of pressure selected so as to be free of interference by liquid in a state of motion whereby an untrue reading of static pressure which may result from such interference is prevented. By this means the accuracy of torque indication is appreciably increased as the pressures applied to the indicating devices are freed from interference by pressure differences arising from the motion and velocity of the fluid in the passages connecting the pressure chambers or spaces with the circulating pump.

A further feature of the present invention consists of a modification of the arrangement of the ports by which the high pressure oil or other liquid is admitted into the working chambers or spaces of the torque transmitting elements, to permit of measurements of torque being made in either direction of relative rotation of the two rotating elements.

According to this second feature of the invention the radial passages formed in the arms of one of the elements terminate at a point or points on the arms where in the neutral or zero torque position they are open to passages, formed in the mating element which convey the liquid simultaneously to the high and low pressure chambers on each side of the arms.

A third object of the invention is to enable the torque-indicating gauge or the torque-indicating weighing machine to indicate the magnitude of the torque being transmitted irrespective of the direction of rotation.

According to this third feature of the invention the same relative motion of the arms of one element towards the arms of the other element arising from the transmission of torque, is utilised to connect independent pressure-tapping passages with the high pressure and low pressure chambers respectively, these pressure-tapping passages terminating at the extremity of the arms of one element in holes which are connected to one chamber or another of each pair of chambers by ports formed in the adjacent material of the other element.

A fourth object of the present invention is to enable the dynamometer to transmit and measure thrust thereby adapting it to uses such as the driving of propellors for aircraft and marine use.

The invention is illustrated in and will be described with reference to the accompanying drawings in which:

Fig. 1 is a longitudinal section of a dynamometer embodying the features of the invention, the section being taken on line 1—1 of Fig. 2.

Fig. 2 is a transverse section on line 2—2 of Fig. 1,

Fig. 3 is a transverse section on line 3—3 of Fig. 1,

Fig. 4 is a transverse section on line 4—4 of Fig. 1,

Fig. 5 is a transverse section on line 5—5 of Fig. 1, the relative positions of the two members shown in this figure being that with maximum torque applied to the shaft or inner member in a counterclockwise direction, Fig. 6 is a transverse section on line 6—6 of Fig. 1, Fig. 7 is a transverse section on line 7—7 of Fig. 1, of the inner member drawn to a larger scale than Figs. 1 to 6, Fig. 8 is a diagrammatic view showing one means of measuring the differential pressure between the high pressure chambers and low pressure chambers for obtaining an indication of the torque, Fig. 9 is a diagrammatic view showing a further means for the same purpose, Fig. 10 is a longitudinal section on line 10—10 in Fig. 2.

In the embodiment of the invention illustrated in the drawings the driving element is shown as a spider with outwardly radiating arms and the driven element as an annulus surrounding the spider with inwardly radiating arms but it will be obvious after perusal of the following description of the apparatus that the driving and driven elements can be reversed, i. e. the driven element can be the spider and the driving element the surrounding annulus, by slight modification of the valves and passages for the oil or other liquid.

Further in the following description the torque transmitting liquid will be referred to as oil which is found to be the most suitable but it is not intended that it should be limited to oil as other liquids can be employed in place thereof.

The drawings show a driving element A to the end of which a coupling B is keyed or otherwise secured to which the flange of the driving shaft can be bolted or otherwise affixed and a driven element D formed with or secured to a coupling E to which the flange of the driven shaft can be bolted or otherwise affixed.

The driving element A is in the form of a hollow shaft for the greater part of its length but near the end remote from the coupling B it is formed as a spider with a boss $A^1$ from which a number of arms $a$ radiate (four such arms being shown on the drawings), the arms $a$ being spaced around the boss at equal angular distances apart.

The driven element D is in the form of an annulus $D^1$ to which inwardly radiating arms $d$ are affixed the arms $d$ being equal in number to the arms $a$ and spaced at equal angular distances apart. The arms $d$ are preferably provided on their radial faces with stops or projections $d^{12}$ to limit the relative angular movement of the arms $a$ and $d$. The annulus $D^1$ is located between the cylindrical flange $e$ of the coupling member E and the cylindrical flange $e^1$ of a disc member $E^1$ being affixed to the members E and $E^1$ by the bolts $d^1$. The coupling E and the disc member $E^1$ are both mounted on and capable of angular movement in relation to the shaft like portion $A^2$ of the driving element A.

The driven element D is assembled around the spider portion of the driving element A with the arms $d$ of the former interspaced between the arms $a$ of the latter thereby forming eight radial chambers or spaces $g^1$ to $g^8$. The arms $a$ of the driving element extend to the inner surface of the annulus $D^1$ and the arms $d$ of the driven element extend to the surface of the boss $A^1$ of the spider so that each of the chambers $g^1$ to $g^8$ is bounded by an arm $a$, and adjacent arm $d$, the boss $A^1$ and the annulus $D^1$.

The driving element A is formed with four longitudinal concentric passages $a^3$, $a^{11}$, $a^{14}$ and $a^2$ and the arms $a$ of the element A are formed with two sets of radial passages $a^4$ and $a^{10}$ communicating respectively with the longitudinal passages $a^3$ and $a^{11}$ and the central or hub portion of the element A is formed with two sets of radial passages $a^5$ and $a^{13}$ communicating respectively with the longitudinal passages $a^2$ and $a^{14}$.

The shaft like portion $A^2$ of the driving element A rotates in the sleeve J and is formed with four sets of radial passages $a^8$, $a^7$, and $a^{12}$ and $a^{15}$, which communicate respectively with the longitudinal passages $a^3$, $a^2$, $a^{11}$ and $a^{14}$.

The sleeve J is formed on its inner surface with four annular grooves $j^1$, $j^6$, $j^2$ and $j^5$ coinciding respectively with the outer ends of the radial passages $a^8$, $a^7$, $a^{12}$ and $a^{15}$. The groove $j^1$ is connected by the passages $j^{10}$ to a port S connected to an external pump by which oil is supplied to the dynamometer; the groove $j^6$ is connected by the passages $j^{11}$ to a port R connected to an oil sump from which oil is extracted by the aforesaid pump; the groove $j^2$ is connected by the passage $j^{12}$ to a port $P^1$ connected to a pressure measuring device; and the groove $j^5$ is connected by the passage $j^{13}$ to a port $P^2$ also connected to the pressure measuring device.

The driven element D is provided on its inner face with a series of pairs of arcuate slots $d^3$ and $d^4$ so arranged that when the arms $a$ of the element A are in the neutral position midway between the arms $d$ of the element D as shown in Fig. 2, each radial passage $a^4$ is in communication with the corresponding two chambers $g^1$ and $g^2$, $g^3$ and $g^4$, $g^5$ and $g^6$, $g^7$ and $g^8$ at each side of an arm $a$.

The driven element D is also provided in its inner face with a second series of arcuate slots $d^5$ and $d^6$ so arranged that when the arms $a$ of the element A are in the neutral position midway between the arms $d$ of the element D as shown in Fig. 3, each radial passage $a^{10}$ is cut off from the corresponding two chambers $g^1$ and $g^2$, $g^3$ and $g^4$, $g^5$ and $g^6$, $g^7$ and $g^8$ at each side of the arm $a$ but on any relative angular movement of the arms $a$ and $d$ from this neutral position the passages $a^{10}$ are put into communication either with the chambers $g^1$, $g^3$, $g^5$ and $g^7$ or with the chambers $g^2$, $g^4$, $g^6$ and $g^8$ according to the direction of such movement.

The outer ends of the passages $a^5$ in the hub of the element A are enlarged so that they are wider than the ends of the arms $d$ thus forming ports $a^9$ and $a^6$ at each side of the arms $d$ (see Fig. 5).

The port openings of passages $a^{13}$ are approximately the same width as the ends of arms $d$ so that in the neutral position they are on the point of communicating with either adjacent chamber (see Fig. 4).

The operation of the above described features of dynamometer is as follows:

Oil supplied by an external pump is delivered to the feed connection S and flows therefrom through the passages $j^{10}$ in the sleeve J to the passages $a^8$ formed in the shaft portion $A^2$ of the driving element A. The oil then passes through the longitudinal passage $a^3$ into the passages $a^4$ formed in the radial arms $a$ of the driving element A.

In the position of neutral torque indicated by Fig. 2, the oil is then split into two streams and passes through the arcuate slots $d^3$, $d^4$, into the chambers $g^1$ to $g^8$ from which it escapes through the outlet ports $a^6$ and $a^9$ shown in Fig. 5, to the radial passages $a^5$ and thence through the longitudinal passage $a^2$ and radial passages $a^7$ (shown in Fig. 1,) into the annular groove $j^6$ of the sleeve J and thence through the passages $j^{11}$ and connection R to a sump from which it is extracted for recirculation by the pump.

On the application of torque, however, in either direction of rotation, the arms $a$ of the driving element A tend to approach the radial arms $d$ of the driven element D and in doing so open up the ports $a^4$ to one of each pair of chambers $g^1$, $g^2$, $g^3$, $g^4$, $g^5$, $g^6$, and $g^7$, $g^8$ and close access of oil to the other. Assuming the torque is applied to the driving element A in a counter-clockwise direction and consequently the angular movement of the arms $a$ to the arms $d$ is in the same direction as shown in Fig. 5, then the chambers $g^1$, $g^3$, $g^5$ and $g^7$ become the high pressure chambers, the ports $a^9$ thereto are partially closed and the ports $a^6$ to the low pressure chambers $g^2$, $g^4$, $g^6$ and $g^8$ are more fully opened. If however, the torque is applied in a clockwise direction the angular movement of the arms $a$ to the arms $d$ is also in a clockwise direction, the chambers $g^2$, $g^4$, $g^6$ and $g^8$ become the high pressure chambers and the chambers $g^1$, $g^3$, $g^5$ and $g^7$ become the low pressure chambers, the ports $a^6$ being partially closed and the ports $a^9$ more fully opened. Thus, whether torque is applied in a counter-clockwise or in a clockwise direction the egress of oil to the passages $a^5$ from the high pressure chambers is automatically restricted whilst the egress of oil to the passages $a^5$ from the low pressure chambers is facilitated and any oil leaking from the high pressure to the low pressure chambers returns to the sump via the passages $a^5$, $a^2$, $a^7$, $j^6$, $j^{11}$ and connection R.

The differential pressure of the oil between the high pressure chambers and low pressure chambers acting upon the effective area of the arms $a$ and $d$ at a known mean radius from the axis of rotation of the dynamometer is equivalent to the torque being transmitted from the driving element A to the driven element D and by measuring the magnitude of this differential pressure the correct indication of torque can be obtained.

In the transmission dynamometer of the type referred to the indication of torque is obtained by measuring the difference of pressure which exists across the annular grooves equivalent to the grooves $j^1$ and $j^6$ in the sleeve J connected to the pump and sump respectively but it has now been found that owing to the effects of oil velocity in the various passages connecting these grooves with the high and low pressure chambers $g^1$ to $g^8$ that the differential pressure between each pair of these chambers is not the same as exists across the annular grooves $j^1$ and $j^6$ and accordingly as hereinbefore described additional radial passages $a^{10}$ and $a^{13}$ are formed in the arms $a$ and hub $A^1$ of the element A and there are provided additional longitudinal passages $a^{11}$ and $a^{14}$ communicating with the radial passages $a^{12}$ and $a^{15}$ in the shaft portion $A^2$ and the latter passages in turn communicate with the connections $P^1$ and $P^2$ respectively by way of the annular groove $j^2$ and passage $j^{12}$ and the annular groove $j^5$ and passage $j^{13}$.

In the position of neutral torque (Figs. 1 and 3), the passages $a^{10}$ in the arms $a$ are closed but on the application of torque, as previously described the arms $a$ tend to approach the arms $d$ and thereby to open up the passages $a^{10}$ through one or other of the arcuate slots $d^5$ and $d^6$ according to the direction of rotation, with the high pressure chambers of the chambers $g^1$ to $g^8$ and to shut off communication with the low pressure chambers. There is thus, a free connection from the high pressure chambers through passages $a^{10}$, and $a^{11}$, and $a^{12}$ to the annular groove $j^2$ in the sleeve J and connection $P^1$.

At the same time the relative movement of the arms $a$ to the arms $d$ opens the passages $a^{13}$ to the low pressure chambers of the chambers $g^1$ to $g^8$ whereby these chambers are connected to the annular groove $j^5$ in the sleeve J by the passages $a^{13}$, $a^{14}$ and $a^{15}$ and thence through the passage $j^{13}$ to the connection $P^2$.

Since the oil between the high pressure chambers and the connection $P^1$ and between the low pressure chambers and the connection $P^2$ is static and the connection $P^1$ is always in communication with the high pressure chambers and the connection $P^2$ with the low pressure chambers whether the torque is applied in a counterclockwise or a clockwise direction it follows that a true indication of the torque will be obtained by measuring the differential pressure between the points $P^1$ and $P^2$.

This differential pressure may be measured by similar means to those illustrated in Figs. 8 and 9.

In Fig. 8, a differential pressure gauge M, preferably calibrated in terms of torque is connected between a pipe $K^1$ connected to the high pressure connection $P^1$ and a pipe $K^2$ connected to the low pressure connection $P^2$ thereby giving a correct reading in terms of torque of the differential pressure between the points $P^1$ and $P^2$ and consequently between the high pressure chambers and the low pressure chambers of the torque elements. A damping cock $m$ may be inserted in the pipe line $K^2$ in order to prevent fluctuations of torque from causing undue flutter of the indicating needle of the gauge.

An alternative form of torque indicating device is shown in Fig. 9. This consists of an oil cylinder $n$ having a piston $n^1$ therein, one side of which is connected by the pipe line $K^1$ to the high pressure connection $P^1$ and the other side by the pipe line $K^2$ to the low pressure connection $P^2$. The piston $n^1$ is mounted preferably on a vertical axis and actuates a piston rod $n^2$ which under the influence of the differential oil pressure, tends to lift the weights $w$ which are carried by the upper end of the piston rod $n^2$. One or more such weights may be utilised, some of them being loose and removable from the suspension means when light torques have to be measured. The piston rod $n^2$ is extended upwardly and coupled to a weighing machine or spring balance arranged to measure intermediate loads and to act as a vernier to the weights. Both weights and weighing machine are calibrated in units of torque and also, for checking purposes, if units of weight. If desired multiplying levers may be interposed between the weighing machine P or weights $w$ and the piston rod $n^2$.

To prepare the apparatus for indication of the torque the fixed weight is adjusted until the pointer of the weighing machine P indicates zero when there is no pressure difference between the chambers $g^1$, $g^3$, $g^5$ and $g^7$ and the chambers $g^2$, $g^4$, $g^6$ and $g^8$ i. e. when there is no torque being transmitted by the dynamometer. On the generation of torque the pressure of the oil beneath the piston $n^1$ exceeds the pressure of the oil above it and the piston tends to raise the fixed weight, the relieved load and consequently the torque being indicated by the weighing machine. If the torque i. e. the differential pressure increases beyond the capacity of the fixed weight one or more loose weights are added to the piston rod and their value to the readings of torque on the indicating dial P.

Other indicating devices, such as a mercury column responsive to pressure and therefore capable of being calibrated in terms of torque may be employed. If a mercury column is employed it is provided with two legs connected respectively to the high pressure pipe $K^1$ and the low pressure pipe $K^2$. The difference in height of the mercury in the two legs is proportional to the torque and may be calibrated in terms of torque.

As hereinbefore stated an object of the invention is to provide means for transmitting and measuring thrust. For this purpose annular spaces $s^1$ and $s^2$ are provided between the ends of the arms $d$ and the adjacent inner radial faces $d^7$ and $d^8$ respectively of the members $E^1$ and E which form part of or are affixed to the element D. The annular space $s^1$ is bounded, with small working clearance, by the discs $A^3$ and $A^4$ secured to the arms $a$ of the element A and similarly the annular space $S^2$ is bounded by discs $A^5$ and $A^6$ also secured to the arms $a$. The discs $A^3$ and $A^4$ and $A^5$ and $A^6$ are of an outside diameter to fit rotatably and to move axially within the inner periphery of the element D, thus permitting relative axial movement between the elements A and D. The discs $A^4$ and $A^5$ i. e. the discs of each pair adjacent to the arms $a$, are slotted at their periphery to form ports $q^1$ and $q^2$ and ports $q^3$ of an axial dimension substantially equal to the axial thickness of the discs $A^3$ and $A^6$ respectively are similarly formed on the inner periphery of the element D in such a position that when the elements A and D are in the position of neutral torque as shown in Fig. 6, each port $q^3$ lies midway between the corresponding pair of ports $q^1$ and $q^2$ and is not in register with either of them. The radial arms $d$ of the element D are thus, enclosed with small endwise clearance between the inner faces of the discs $A^4$ and $A^5$.

As will be evident when the means for measuring the thrust are hereinafter described, the effective areas of the surfaces of the discs $A^3$ and $A^6$ facing the chambers $s^1$ and $s^2$ must be the same, and this is obtained by making the two discs of the same external and internal diameters, and by extending the shaft-like portion $A^2$ of the element A beyond the chamber $s^2$ so that this end of the portion $A^2$ is enclosed by the boss of the element D.

In the mid axial position of the element A relative to the element D, i. e. the position of neutral thrust shown in Fig. 1, the plane $d^9$ separating the discs $A^3$ and $A^4$ coincides with the plane surface $d^{10}$ of the element D and likewise the plane surface $d^{11}$ separating the discs $A^5$ and $A^6$ coincides with the plane surface $d^{13}$ of the element D.

When the elements A and D are in the position of neutral torque and neutral thrust, i. e. the position shown in Figs. 1 and 6, there is little or no communication between the chambers $g^1$ to $g^8$ and the spaces $s^1$ and $s^2$ since neither of the sets of ports $q^1$ and $q^2$ are in communication with the ports $q^3$, but when torque is transmitted in a counter-clockwise direction, e. g. for the purpose of driving a propellor or the like, the radial arms $a$ tend to approach the arms $d$ as previously described and as indicated in Fig. 5, and the chambers $g^1$, $g^3$, $g^5$, $g^7$ become subject to relatively high oil pressure while the remaining chambers $g^2$, $g^4$, $g^6$, $g^8$ acquire a relatively low pressure. (Reversal of torque as previously described creates the converse condition). The same angular movement of the element A in relation to the element D causes the ports $q^1$ to move into register with the ports $q^3$, the ports $q^2$ remaining out of register therewith, while owing to the transmission of thrust from the propellor or the like through the driven element D to the driving element A, the axial motion of the element D relatively to the element A from left to right causes the disc $A^6$ to close communication between the ports $q^1$ in the disc $A^5$ and the corresponding ports $q^3$ in the element D by moving the ports $q^1$ inwardly in the element D beyond the ports $q^3$ in said element, and at the same time causes the ports $q^1$ in the disc $A^4$ to be put into communication with their corresponding ports $q^3$. (Thrust in the opposite direction would have the effect of closing communication of the ports $q^1$ in the disc $A^4$ with the corresponding ports $q^3$ and opening communication of the ports $q^1$ in the disc $A^5$ with their corresponding ports $q^3$.) Since the ports $q^1$ in the disc $A^4$ under these conditions are in communication with the high pressure chambers $g^1$, $g^3$, $g^5$ and $g^7$ oil will flow through the narrow passage created between the ports $q^1$ and $q^3$ into the chamber $s^1$, and the pressure of oil will rise therein until it exerts sufficient force to counteract the magnitude of the thrust and force the disc $A^3$ and the element A to which it is attached axially away from the face $d^7$ thereby reducing the axial length of the registering portions of the ports $q^1$ and $q^3$ and thus throttling the flow of oil through the narrow passage between the ports $q^1$ and $q^3$ into the chamber $s^1$ until equilibrium is restored.

Leak-off or bleed holes $s^3$ and $s^4$ from the chambers $s^1$ and $s^2$ are formed to extend through the discs $A^3$, $A^4$ and $A^5$, $A^6$ respectively in such angular positions adjacent to the arms $d$ of the element D, as shown in Fig. 6, that one of these holes in each of these pairs of discs is masked by the ends of arms $d$ when torque is applied, whilst the remaining holes in these pairs of discs provide restricted communication between the chambers $s^1$, $s^2$ and the low pressure chambers $g^2$, $g^4$, $g^6$ and $g^8$ into which oil can slowly bleed off or escape, thereby gradually tending to drain oil from the said spaces $s^1$ and $s^2$ and avoiding the possibility of locking element A to element D despite alterations in magnitude of thrust.

The thrust is thus automatically balanced by the differential pressure of the oil in the chambers $s^1$ and $s^2$ acting on the faces of the discs $A^3$ and $A^6$ respectively and by measuring this differential pressure an indication of the thrust can be obtained.

In order to measure the differential pressure between the chambers $s^1$ and $s^2$ a radial passage $t^1$ is formed in the shaft like portion $A^2$ of the element A adjacent to the chamber $s^1$ and the passage $t^1$ communicates with a longitudinal passage $t^2$ in the portion $A^2$. The passage $t^2$ communicates with a radial passage $t^3$ which enters a groove $j^8$ in the sleeve J and the groove $j^8$ is connected to a connection $T^1$ from which a pipe line communicates the oil pressure in the chamber $s^1$ to one portion of a thrust measuring device. Similarly a radial passage $t^4$ in the element A connects the chamber $s^2$ with longitudinal passages $t^5$ in the portion $A^2$. The passages $t^5$ communicate with a groove $j^7$ in the sleeve J connected to a connection $T^2$ from which a pipe line communicates the oil pressure in the chamber $s^2$ to the other portion of a thrust measuring device.

The thrust measuring device preferably consists of a weighing device N similar to that shown in Fig. 9, or alternatively it may comprise a differential pressure gauge as shown in Fig. 8, or any other suitable pressure measuring device.

In order to prevent loss of oil by leakages the spaces $s^5$ and $s^6$ (see Figs. 1 and 10) are connected together by the passage $t^7$ and the space $s^5$ is connected by the longitudinal passages $t^8$ with an annular groove $j^9$ in the sleeve J whence any leaking oil is returned to the sump through the connection $T^5$.

Any leakage of oil in sleeve J is returned to the sump by the annular groove $j^{15}$ and connection $T^6$.

It will be appreciated that the thrust transmitting and measuring portion of the device herein described may be omitted without detracting from the torque transmitting and measuring features of the dynamometer.

I claim:

1. In a transmission dynamometer of the kind referred to and comprising a driving element having a plurality of arms radiating therefrom, a driven element concentric therewith and having an equal number of radiating arms interspaced between the arms of the driving element, the interspaced arms of the two elements forming a series of chambers the number of which is twice the number of the arms on each element, half of said chambers being filled under running conditions with liquid under pressure and the remaining chambers, which alternate with those filled with liquid under pressure, being filled with liquid at a lower pressure, and inner element being formed with passages connecting the high pressure chambers and low pressure chambers respectively with a pump supplying liquid under pressure and with a liquid reservoir, the combination a differential pressure responsive torque indicating device, means providing additional passages in the inner element connecting the high pressure chambers and the low pressure chambers respectively to said torque indicating device, the said chambers being thus connected to the said indicating device by means independent of the passages in which the circulating fluid is conveyed to and from the said chambers whereby a more accurate indication of torque is obtained since the pressures applied to the indicating device are free from interference by pressure differences arising from motion and velocity of the fluid.

2. In a transmission dynamometer as in claim 1, the combination with the inner element thereof of a stationary sleeve surrounding a portion of the said element, the sleeve being formed with radial passages with which the passages in the inner element communicate, one pair of radial passages being connected to the sides of said differential torque indicating device whereby the pressure communicating passages of the inner element are independently connected to the said torque indicating device.

3. A transmission dynamometer as in claim 1, wherein the passages are in the driving element and the passages through which the fluid under pressure is delivered to the chambers are put into communication with one or the other of the two sets of chambers according to the direction of the relative angular movement of the driving and driven elements and the passages connecting the chambers to the liquid reservoir are put into communication with the other set of chambers whereby either set of chambers will become the high pressure chambers and the other set the low pressure chambers according to the direction of the relative angular movement of the two elements thereby allowing the dynamometer to transmit torque in either direction.

4. A transmission dynamometer as in claim 1, wherein the passages are in the driving element and the passages through which the fluid under pressure is delivered to the chambers are put into communication with one or the other of the two sets of chambers according to the direction of the relative angular movement of the driving and driven elements and the passages connecting the chambers to the liquid reservoir are put into communication with the other set of chambers whereby either set of chambers will become the high pressure chambers and the other set the low pressure chambers according to the direction of the relative angular movement of the two elements thereby allowing the dynamometer to transmit torque in either direction, said passages communicating with the pump being in part in the arms of the driving element, and communicating means comprising a pair of arcuate slots formed in the inner periphery of the driven element at each side of the mid-position of each arm of the driving element such slots connecting the passage in each arm communicating with the pump with one or the other of the chambers at each side of the arm according to the relative direction of angular movement of the driving element whereby said chamber becomes the high pressure chamber and the other the low pressure chamber.

5. A transmission dynamometer as in claim 1, wherein the passages are in the driving element and the passages through which the fluid under pressure is delivered to the chambers are put into communication with one or the other of the two sets of chambers according to the direction of the relative angular movement of the driving and driven elements and the passages connecting the chambers to the liquid reservoir are put into communication with the other set of chambers whereby either set of chambers will become the high pressure chambers and the other set the low pressure chambers according to the direction of the relative angular movement of the two elements thereby allowing the dynamometer to transmit torque in either direction, said passages communicating with the pump being in part in the arms of the driving element, and communicating means comprising a pair of arcuate slots formed in the inner periphery of the driven element at each side of the mid-position of each arm of the driving element such slots connecting the passage in each arm communicating with the pump with one or the other of the chambers at each side of the arm according to the relative direction of angular movement of the driving element whereby said chamber becomes the high pressure chamber and the other the low pressure chamber, the outlets from the passages in the driving element connected to the low pressure side of the indicating device coinciding with the inner portions of the arms of the driven element so that on relative angular movement of the two elements each low pressure passage in the driving element is put into communication with the chamber of each pair of chambers not in communication with the passage in the corresponding arm of the driving element.

6. A transmission dynamometer as in claim 1, wherein the passages are in the driving element and the passages through which the fluid under pressure is delivered to the chambers are put into communication with one or the other of the two sets of chambers according to the direction of the relative angular movement of the driving and driven elements and the passages connecting the chambers to the liquid reservoir are put into communication with the other set of chambers whereby either set of chambers will become the high pressure chambers and the other set the low pressure chambers according to the direction of the relative angular movement of the two elements thereby allowing the dynamometer to transmit torque in either direction, said passages communicating with the pump being in part in the arms of the driving element, and communicating means comprising a pair of arcuate slots formed in the inner periphery of the driven element at each side of the mid-position of each arm of the driving element such slots connecting each passage in the arm communicating with the pump with one or the other of the chambers at each side of the arm according to the relative direction of angular movement of the driving element whereby said chamber becomes the high pressure chamber and the other the low pressure chamber, the outlets from the passages in the driving element connected to the low pressure side of the indicating device coinciding with the inner portions of the arms of the driven element so that on relative angular movement of the two elements each low pressure passage in the driving element is put into communication with the chamber of each pair of chambers not in communication with the passage in the corresponding arm of the driving element and the passages connecting the high pressure chambers and the low pressure chambers to the differential pressure indicating device are so arranged that whichever set of chambers become the high pressure chambers according to the direction of relative movement of the driving and driven elements such set will be connected to the high pressure side of the differential pressure indicating device and the other set which become the low pressure chambers will be connected to the low pressure side of the indicating device.

7. A transmission dynamometer as in claim 1, having an annular chamber between the driving element and the driven element at each end of the former and a pair of discs located in each chamber and secured to the driving element, the inner disc of each pair being provided with a peripheral port adapted to register or not with a corresponding port in the inner periphery of the driven element and said port in the inner disc of each pair communicating with certain of said chambers, whereby when thrust causes a relative movement of the two elements in one direction and the size of the corresponding annular chamber is diminished such chamber will be connected to the high pressure chambers between the arms of the two elements of the dynamometer for the purpose of bringing the two elements into equilibrium.

8. A transmission dynamometer as in claim 1, having an annular chamber between the driving element and the driven element at each end of the former and a pair of discs located in each chamber and secured to the driving element, the inner disc of each pair being provided with a peripheral port adapted to register or not with a corresponding port in the inner periphery of the driven element and said port in the inner disc of each pair communicating with certain of said chambers, whereby when thrust causes a relative movement of the two elements in one direction and the size of the corresponding annular chamber is diminished such chamber will be connected to the high pressure chambers between the arms of the two elements of the dynamometer for the purpose of bringing the two elements into equilibrium and means connecting said annular chambers with the opposite sides of a differential pressure indicating device whereby the difference in pressure between the chambers, i. e. the end thrust will be indicated.

GEORGE HENRY WALKER.